Patented May 29, 1945

2,377,044

UNITED STATES PATENT OFFICE 2,377,044

PANTOTHENIC ACID FORMATION

Alfred S. Schultz and Lawrence Atkin, Bronx, and Charles N. Frey, Scarsdale, N. Y., assignors to Standard Brands Incorporated, New York, N. Y., a corporation of Delaware No Drawing. Application July 12, 1940, Serial No. 345,114

3 Claims. (Cl. 195—82)

The invention relates to a process for the preparation of pantothenic acid. More particularly, it pertains to a procedure for the synthesis of pantothenic acid in the presence of a yeast, and includes correlated improvements and discoveries concerned therewith.

It is an object of the invention to provide a process for the production of pantothenic acid in accordance with which beta alanine is reacted under the influence of yeast.

A further object of the invention is the provision of a procedure for the synthetic preparation of pantothenic acid in a manner that may be effectively, readily and economically carried out.

Another object of the invention is the provision of a method whereby pantothenic acid is synthesized through the intermediation of a yeast, during growth of the yeast, in a medium containing nutrient, molasses, and a relatively large amount of beta alanine.

Other objects of the invention will in part be obvious and will in part appear hereinafter.

The invention accordingly comprises the several steps and the relation of one or more of such steps with respect to each of the others, which are exemplified in the following detailed disclosure, and the scope of the invention will be indicated in the claims.

In the practice of the invention a synthesis of pantothenic acid may be accomplished through the preparation of a medium, e. g. a wort, which may contain yeast nutrient materials, as a carbohydrate and a nitrogen-containing compound, growth promoting factors, and a relatively large amount of beta alanine. The nutrient medium, accordingly, may be composed of a molasses, as a yeast assimilable carbohydrate material, a nitrogen source which may be ammonia, an ammonium salt, asparagine, and the like, and a relatively large amount of beta alanine, for example 6,000 gammas in a nutrient medium designed to grow yeast by the zulauf process using 300 grams molasses. Moreover, this amount may be 24,000 gammas.

The medium may be seeded with a suitable yeast, which may be a *Saccharomyces cerevisiae*, and more especially in an amount of about 20% and of the Gebruder-Mayer strain. When the yeast is grown in the medium containing the decided amount of beta alanine, there is obtained a good yield, with satisfactory protein content and a distinctive proportion of pantothenic acid. It was found also that when the yeast so produced was used in the manufacture of baked goods, the fermentation times were of a satisfactory duration. The beta alanine incorporated with a wort as above described, i. e., in relatively large amounts, reacts with the formation of pantothenic acid under the influence of yeast which appears to serve as a catalytic agent. It is not known definitely at this time whether the synthesis of pantothenic acid takes place without or within the yeast cell. However, the pantothenic acid formed is found within the cell. Thus, there is produced a yeast carrying a markedly enhanced amount of pantothenic acid.

As an illustrative embodiment of a manner in which the invention may be practiced, the following examples are presented:

Example I

Yeast was grown in a wort containing a mixture of cane and beet molasses, together with nitrogen nutriments in the form of ammonia and asparagine. To this wort there was also added 6,000 gammas beta alanine. The wort was seeded with 20% of a Gebruder-Mayer yeast, and propagation effected under aeration and with addition of further nutrients in accordance with the zulaufing procedure. A small amount of ammonium phosphate was also present in the wort. The distinguishing characteristics and varying conditions of the nutrient medium; the properties possessed by the yeast when used in the preparation of bread; protein present, and the yields obtained, based upon 27% solids, were as given in the following table:

| Run | | Proof times | | Protein on solids | Yield 27% solids |
|---|---|---|---|---|---|
| | | Sponge | Straight | | |
| A | NH₃ check | 99 59 | 101 64 59 | 49.9 | 92 |
| B | 30 g. asparagine check | 94 57 | 97 62 59 | 49.7 | 98 |
| C | NH₃+6000 gamma beta alanine | 98 58 | 108 65 64 | 48.3 | 93 |
| D | 30 g. asparagine +6000 gamma beta alanine | 97 58 | 103 64 64 | 53.4 | 99 |
| E | NoNH₃ | 123 72 | 136 84 75 | 33.2 | 62 |

The yeasts produced in the foregoing runs were dried by means of a fan, and the pantothenic acid present determined by the results obtained when the dried yeasts were introduced into a medium containing a Gebruder-Mayer yeast. The content of the pantothenic acid is evidenced by the influence upon the crop of yeast obtained, and the wort, in addition to a carbohydrate material, contains vitamins $B_1$ and $B_6$, ammonium sulfate, asparagine, and growth promoting factors I and $II_B$. This medium may have a volume of about 30 ml., and when fully prepared and contained in a suitable vessel, may be placed in a bath at a temperature of about 30° C., and rocked for about 24 hours. The crops of yeast obtained, together with the amount of various yeasts incorporated, are given below, and the crop $\times 4.54$ gives the mg. of moist yeast:

| Yeast from run | Amount of dry yeast, mgs. | Crop |
|---|---|---|
| A | 20 | 90 |
|   | 40 | 150 |
|   | 80 | 190 |
| B | 20 | 100 |
|   | 40 | 160 |
|   | 80 | 205 |
| C | 20 | 105 |
|   | 40 | 170 |
|   | 80 | 240 |
| D | 20 | 110 |
|   | 40 | 170 |
|   | 80 | 250 |
| E | 20 | 50 |
|   | 40 | 125 |
|   | 80 | 170 |

It is therefore evidenced from the above table that pantothenic acid is formed synthetically through the propagation or growth of yeast in a nutrient medium to which a relatively large amount of beta alanine has been added. When the mother liquors or beers obtained from the separation of yeast in the runs above described were examined for beta alanine content, it was found that it had in a large measure been converted into pantothenic acid by the growing yeast, and these results, in conjunction with the others given, depict clearly the synthesis of pantothenic acid through the influence of a growing yeast when relatively large amounts of beta alanine are present in the nutrient medium.

*Example II*

The synthesis of pantothenic acid was also shown through utilization of the Fleischmann 189 yeast strain of *Saccharomyces cerevisiae*. This yeast, more particularly, is identified as of a distiller's type of high baking strength and high protein and invertase content, having good keeping qualities and occasioning rapid fermentation of dextrose, sucrose and maltose. The runs were conducted in the same manner as in Example I, with the following results being obtained:

| Run | | Proof times | | | | | Yield 27% solids | Protein on solids |
|---|---|---|---|---|---|---|---|---|
| | | Sponge | | Straight | | | | |
| A | $NH_3$ check | 86 | 48 | 102 | 53 | 52 | 89 | 53.92 |
| B | 30 g. asparagine check | 90 | 49 | 98 | 56 | 53 | 90 | 57.84 |
| C | $NH_3$+24,000 g. beta alanine | 85 | 47 | 98 | 55 | 53 | 86 | 55.5 |
| D | 30 g. asparagine+ 24,000 g. beta alanine | 92 | 50 | 100 | 59 | 53 | 95 | 53.78 |

Since 24,000 gammas are included in 30 ml. of wort, the proportion is 1 part in 1250.

These yeasts were dried under a fan and the pantothenic acid present determined, as in the case of the yeasts in Example I, with seeding being effected with a Gebruder-Mayer yeast, and the following results obtained:

| Yeast from run | Amount mg. dry yeast | Crop |
|---|---|---|
| Yeast dried as above: | | |
| A | 20 | 55 |
|   | 40 | 120 |
|   | 80 | 160 |
| B | 20 | 45 |
|   | 40 | 120 |
|   | 80 | 170 |
| C | 20 | 160 |
|   | 40 | 210 |
|   | 80 | 270 |
| D | 20 | 150 |
|   | 40 | 190 |
|   | 80 | 250 |

The increase in crop values occasioned by the yeasts grown in a medium containing a decided quantity of beta alanine evidences clearly that the amount of pantothenic acid has been decidedly increased through its synthesis from beta alanine under the influence of growing yeast. The foregoing procedures, therefore, lead to the production of a yeast as an article of manufacture which has a pantothenic acid content such that a crop upwards of 240, more particularly of 270, obtains when 80 mg. of a dried yeast is incorporated with a nutrient medium which is seeded with a Gebruder-Mayer yeast.

Growth promoting factor $II_B$ may be produced by an extraction of cane distillery slop with butyl alcohol, methyl isobutyl ketone, or ethyl ether at a pH which is acid to Congo red. The preparation may also be brought about by concentrating molasses slop to 40° Balling and precipitating salts by the addition of alcohol in an amount of about 80%. The alcohol is then evaporated; the residue taken up with water, and an activated carbon introduced thereinto at a pH acid to Congo red. The activated carbon absorbs the factor $II_B$ and this factor may be separated therefrom by elutriation with alcohol. Following distillation of the alcohol, the concentrated $II_B$ residue may be extracted with ethyl ether or methyl isobutyl ketone, and the $II_B$ obtained therefrom by washing with water.

Since certain changes in carrying out the above process may be made without departing from its scope, it is intended that all matter contained in the above description shall be interpreted as illustrative and not in a limiting sense.

Having described our invention, what we claim as new and desire to secure by Letters Patent is:

1. A process for the formation of pantothenic acid, which comprises preparing a nutrient medium containing a molasses, a yeast assimilable nitrogen source, and beta alanine in an amount of about at least 6000 gammas per 300 grams of molasses, seeding with a *Saccharomyces cerevisiae* yeast, and growing the yeast therein, whereby pantothenic acid is produced, and is contained within the yeast cells.

2. A process for the formation of pantothenic acid, which comprises preparing a nutrient medium containing a molasses, a yeast assimilable nitrogen source, and beta alanine in an amount of about at least 6000 gammas per 300 grams of molasses, seeding with a *Saccharomyces cerevisiae* yeast in an amount of about 20%, and growing the yeast therein, whereby pantothenic acid is produced, and is contained within the yeast cells.

3. A process for the formation of pantothenic acid, which comprises preparing a nutrient medium containing a molasses, a yeast assimilable nitrogen source, and beta alanine in an amount of about at least 6000 gammas per 300 grams of molasses, seeding with a Gebruder-Mayer yeast in an amount of about 20%, and growing the yeast therein, whereby pantothenic acid is produced, and is contained within the yeast cells.

ALFRED S. SCHULTZ.
LAWRENCE ATKIN.
CHARLES N. FREY.